United States Patent
Nie et al.

(10) Patent No.: US 9,367,585 B2
(45) Date of Patent: Jun. 14, 2016

(54) DATA STORAGE AND QUERY METHOD

(75) Inventors: Lei Nie, Dongguan (CN); Zhiwei Xu, Dongguan (CN); Guojie Li, Dongguan (CN); Jingjie Liu, Dongguan (CN); Qiang Yue, Dongguan (CN)

(73) Assignee: GUANGDONG ELECTRONICS INDUSTRY INSTITUTE LTD., Dongguan, Guangdong (CN)

( * ) Notice: Subject to any disclaimer, the term of this patent is extended or adjusted under 35 U.S.C. 154(b) by 294 days.

(21) Appl. No.: 14/342,097

(22) PCT Filed: Apr. 18, 2012

(86) PCT No.: PCT/CN2012/000534
§ 371 (c)(1),
(2), (4) Date: Feb. 28, 2014

(87) PCT Pub. No.: WO2013/138953
PCT Pub. Date: Sep. 26, 2013

(65) Prior Publication Data
US 2014/0222778 A1 Aug. 7, 2014

(30) Foreign Application Priority Data
Mar. 20, 2012 (CN) .......................... 2012 1 0073327

(51) Int. Cl.
*G06F 17/30* (2006.01)
(52) U.S. Cl.
CPC .... *G06F 17/30463* (2013.01); *G06F 17/30312* (2013.01)
(58) Field of Classification Search
CPC ................................................. G06F 17/30463
USPC ................................................................ 711/714
See application file for complete search history.

(56) References Cited

U.S. PATENT DOCUMENTS

| 2004/0230571 | A1* | 11/2004 | Robertson | G06F 17/30312 707/999.003 |
| 2012/0136868 | A1* | 5/2012 | Hammerschmidt | G06F 17/30312 707/741 |
| 2013/0130523 | A1* | 5/2013 | Chen | H01R 13/4532 439/136 |
| 2015/0088924 | A1* | 3/2015 | Abadi | G06F 17/30979 707/769 |

FOREIGN PATENT DOCUMENTS

| CN | 102375854 A | 3/2012 |
| JP | 4291458 A | 10/1992 |

OTHER PUBLICATIONS

Lu, Donghai et al., The Analysis of NoSQL Database, Science and Technology of West China, Jan. 2011, pp. 14-16, vol. 10, No. 2.

* cited by examiner

*Primary Examiner* — Alford Kindred
*Assistant Examiner* — Tracy McGhee (57) ABSTRACT

A data storage and query method supporting an agile development and horizontal scaling, in a field of computer applications, includes steps of: transforming data into a 2-tuple (Key, MiniTable) and identifying any MiniTable (having a data set removed) with a unique Key, wherein the MiniTable includes multiple data columns; a structure of each data column is limited by a pre-defined mode; and the data columns are sorted according to a primary key defined by the mode. The data storage and query method obtains a capability of the horizontal scaling via removing dependency among the data sets, and a capability of the agile development via supporting an analogous SQL grammar by saving dependency among the data within the data sets. The data storage and query method can be applied to a data management system which supports the horizontal scaling of big data and the agile development of short development lifecycles.

20 Claims, 3 Drawing Sheets

DATA STORAGE AND QUERY METHOD

CROSS REFERENCE OF RELATED APPLICATION

This is a U.S. National Stage under 35 U.S.C. 371 of the International Application PCT/CN2012/000534, filed Sep. 26, 2013, which claims priority under 35 U.S.C. 119(a-d) to CN 201210073327.2, filed Mar. 20, 2012.

BACKGROUND OF THE PRESENT INVENTION

1. Field of Invention

The present invention relates to a computer application technology, and more particularly to a data storage and query method which supports agile development and horizontal scaling.

2. Description of Related Arts

Along with the rapid development of the internet, especially the emergence of Web 2.0 business including the Online Social Networks and the Online Social Media, the internet industry poses two challenges to the data management system.

Firstly, the data in the internet increases exponentially, which is called Big Data by the relative industry. The Big Data put a huge pressure upon the conventional horizontally scaled data management system. The data management system has become the bottleneck of a great number of internet service systems.

Secondly, the internet business changes rapidly and experiences short product development lifecycles, especially the social sites whose product development lifecycle is counted by day. As the basic component of the internet products, the data management system is required to support the agile development to reduce the product development lifecycle.

Thus, the key to construct the internet service system lies in a data management system which simultaneously supports a horizontal scaling mode of the Big Data and an agile development mode of the short development lifecycle.

There have been two types of data management techniques to support the horizontal scaling mode.

The first technique is Key-Value (KV) Store which abstracts the data into a binary vector (Key, Value). The Key is the only identifier for the storage and query of the data, and the Value is the data content corresponding to the specific Key. The KV Store has following three primitives. Boolean Put (Key, Value): store (Key, Value), if succeed, return True; if fail, return False. Boolean Del (Key): delete (Key, Value), if succeed, return True; if fail or no corresponding Key, return False. String Get (Key): obtain the Value corresponding to the Key, if fail or no corresponding Key, return NULL. Because any two (Key, Value) pairs share no dependency, the horizontal scaling of the KV Store can be accomplished via the consistent hashing or the B+ tree.

The second technique is Key-Row Store, also named as Big Table, which abstracts the data into a nested n+1-dimensional vector (Key, (SubKey 1, Value 1), (SubKey 2, Value 2), . . . , (SubKey n, Value n)). The Key is the only identifier for the storage and query of the data rows; each data row comprises the multiple data; the retrieval of the corresponding Value is accomplished via the SubKey. The Key-Row Store has following five basic primitives. Boolean Put (Key, SubKey, Value): add (SubKey, Value) into the data row corresponding to the Key, if succeed, return True; if fail, return False. Boolean Del (Key): delete the data row corresponding to the Key, if succeed, return True; if fail or no corresponding Key, return False. Boolean Del (Key, SubKey): delete (SubKey, Value) in the data column corresponding to the Key, if succeed, return True; if fail or no corresponding Key or SubKey, return False. String Get (Key): obtain the data column corresponding to the Key, if fail or no corresponding Key, return NULL. String Get (Key, SubKey): obtain the Value corresponding to the SubKey in the data column which corresponds to the Key, if fail or no corresponding Key or SubKey, return NULL. The data columns share no dependency, the same as the KV store, and thus the horizontal scaling of the Key-Row Store can also be accomplished via the consistent hashing or the B+ tree.

Although the above two techniques support the horizontal scaling mode and solve the first challenge which the internet industry poses to the data management system, both of the above two techniques only provide the simple primitives. The simple primitives are unable to rapidly construct applications with complex logic, so both of the two techniques are unable to support the agile development mode and thus fail to solve the second challenge.

The SQL (structured query language) has become one of the primary techniques which allow the data management system to support the agile development because of the uniform standard, the semantic richness and the simple structure thereof. However, the compatibility with the SQL semantics results in the mutual dependency within the data, which excludes the possibility of horizontal scaling. As a result, the conventional relational databases compatible with the SQL semantics only depend on the horizontal scaling and are unable to handle with the challenge from the Big Data of the internet.

SUMMARY OF THE PRESENT INVENTION

An object of the present invention is to provide a data storage and query method, wherein the data storage comprises creating and updating the data. The data storage and query method of the present invention supports an analogous SQL grammar to better suit an agile development while satisfying a horizontal scaling.

Accordingly, in order to accomplish the above objects, the present invention provides a data storage and query method comprising steps of:

transforming data into a 2-tuple (Key, MiniTable) and identifying any MiniTable (having a data set removed) with a unique Key, wherein, the MiniTable comprises multiple data columns; a structure of each data column is limited by a pre-defined mode, and the data columns are sorted according to a primary key defined by the mode.

The pre-defined mode is a Key-MiniTable mode which has three basic primitives and three physical entities, wherein the three physical entities comprise:

a client for initiating a request to a Key server with the three basic primitives and receiving a result of the request;

the Key server for receiving the request initiated by the client, searching an IP address and a port number of each MiniTable server where each MiniTable corresponding to the Key is located, and accordingly transferring the request to the corresponding MiniTable server; and the MiniTable servers respectively for receiving the request transferred by the Key server, parsing analogous SQL statements of the request, forming an execution plan, reading and writing the data in a distributed storage system, completing the request and returning a result of the request to the client;

wherein the Key-MiniTable mode has the following three basic primitives:

(1) Boolean Create (Key, column name 1: data type, column name 2: data type, . . . , column name n: data type, PRIMARY KEY: column name): creating a MiniTable identified as a Key and defining a mode of the MiniTable; if succeed, returning True; if fail, returning False;

(2) Boolean Delete (Key): deleting the MiniTable corresponding to the Key; if succeed, returning True; if fail or no corresponding Key, returning False; and (3) String Query (Key, analogous SQL statement): executing the analogous SQL statement in the MiniTable corresponding to the Key and returning a return value of the analogous SQL statement which is one parameter of the Query primitive, wherein the analogous SQL statement comprises ten reserved words which are Select, Where, Insert, Update, Delete, Order By, Limit, Distinct, And and Or, and six connectives which are $=, >, >=, <=, <$ and $<>$; grammars and semantics of the reserved words and the connectives are defined identically to a standard SQL.

Each MiniTable has a limited size, usually no larger than 64M, for being suitable to be wholly placed into each data block of a Hadoop distributed file system. Two disparate MiniTables are forbidden to inter-table operations of the relational database, such as JOIN; thus it is unnecessary for the multiple tables to be jointly locked. The Key is not only the identifier of the MiniTable, but also an identification of a storage position of the MiniTable in the distributed storage system.

The MiniTable records data via log formats, wherein adding, deleting and revising data are all written into the log at ends of files. When the size of the MiniTable files gets close to a maximum capacity of the data block, an operation of log merging is executed to create a new log file. The Key server and each of the MiniTable servers write the operations into the system log files before executing and write return values into the system log files when the operations are finished or fail.

The Key server has three kernel data structures of:

(1) a B+ tree, for storing corresponding relations between the Keys and address codes;

(2) an address translating table, for storing corresponding relations between the address codes and IP addresses, and between the address codes and the port numbers; and (3) a MiniTable server monitoring table, for storing loading conditions of the MiniTable servers corresponding to each address code.

When the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number.

If the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server.

If the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

Each MiniTable server has two kernel data structures of:

(1) a memory table, for storing the partial MiniTables according to a cache policy; and (2) a MiniTable lock, for recording locked MiniTables.

When the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan. Thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

The present invention also provides a data management system which supports data storage which comprises creating and updating, and data query; the data management system of the present invention also has following two important features. (1) Agile development; the data management system supports an analogous SQL grammar for operations on MiniTable internal data, so as to rapidly accomplish complex logical queries and complex condition insertions. (2) Horizontal scaling; the data management system removes dependency among MiniTables via a Key-MiniTable mode, in such a manner that a capacity and a throughput of the system are expanded quasilinearly by increasing a quantity of servers, so as to support hundred millions of MiniTables and hundred thousands of requests per second.

These and other objectives, features, and advantages of the present invention will become apparent from the following detailed description, the accompanying drawings, and the appended claims.

BRIEF DESCRIPTION OF THE DRAWINGS

The following drawings further illustrate the present invention.

DETAILED DESCRIPTION OF THE PREFERRED EMBODIMENT

Figure 1:
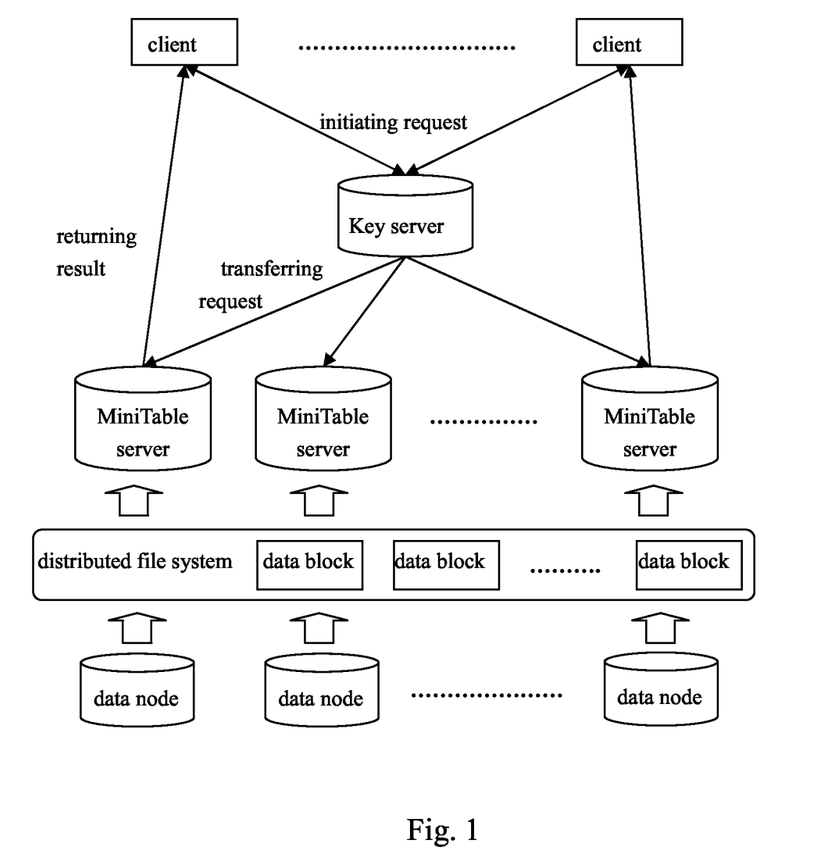
FIG. 1 is a block diagram of a Key-MiniTable system according to a preferred embodiment of the present invention.

Referring to FIG. 1 of the drawings, according to a preferred embodiment of the present invention, a structure of a Key-MiniTable system is illustrated. The Key-MiniTable system is built upon a distributed file system, such as a Hadoop distributed file system (HDFS). Data stored into the distributed file system are divided into following two parts.

(1) MiniTable Log File

MiniTables are stored in data blocks. In order to improve performance of visiting and caching, the data of the MiniTable are controlled to be no larger than a maximum capacity of the data block, usually 64M. In order to improve performance of writing, the MiniTables record data in a log format, wherein adding, deleting and revising the data are all written into the logs at ends of the files. When a size of the MiniTable files gets close to the maximum capacity of the data block, an operation of merging logs is executed to create a new log file.

(2) System Log File

A Key server and each MiniTable server write an operation into the system log file before executing the operation and also write a return value into the system log file when the operation is finished or fails. Then system is able to recover a former normal state from a system failure via maintenance of the system log file.

When a user needs to create, update or delete the data, the user initiates a primitive request to the Key server via a client.

Figure 2:
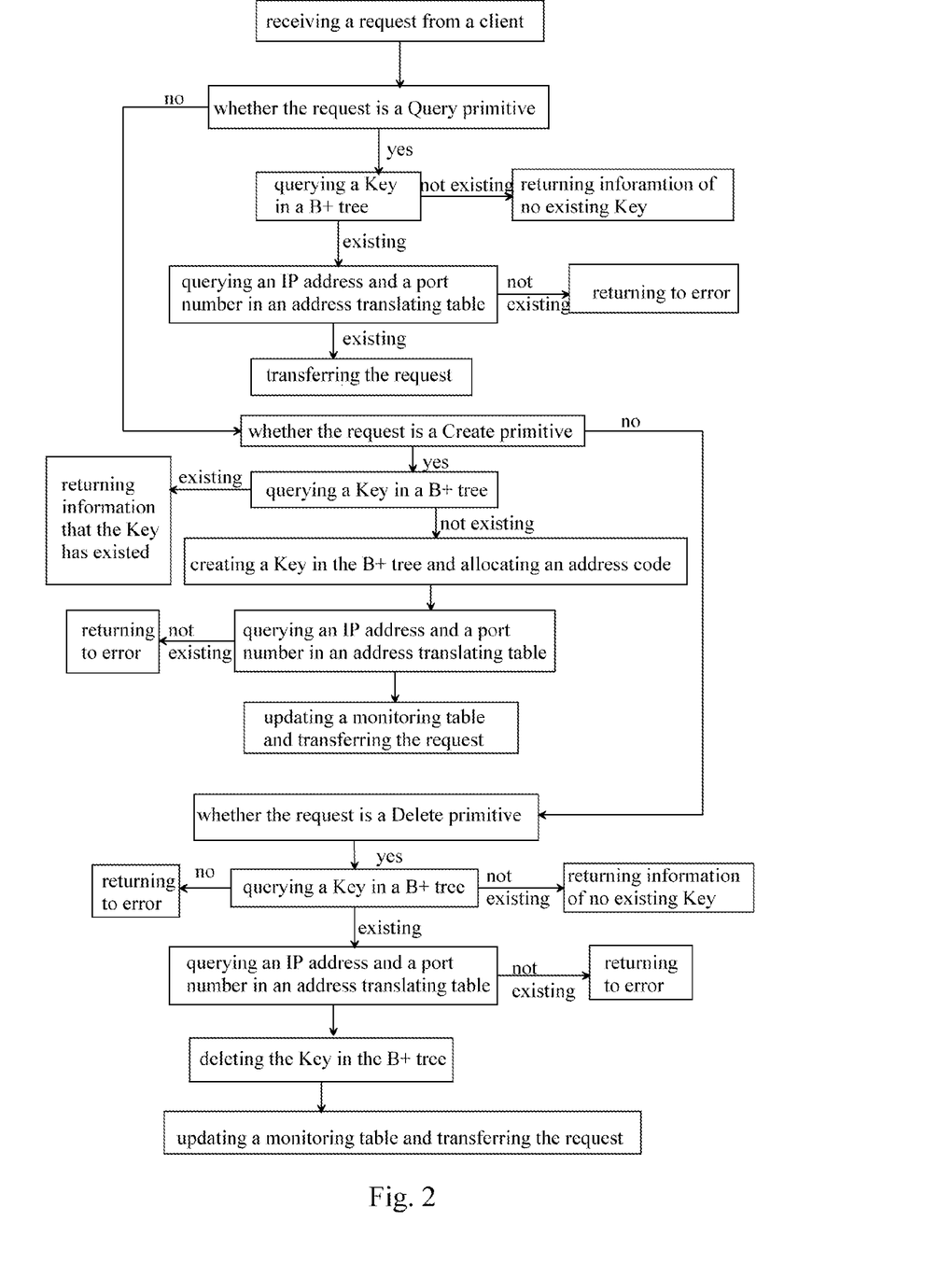
FIG. 2 is a flow chart of a Key server according to the preferred embodiment of the present invention.

FIG. 2 shows subsequent executions of the Key server. The Key server has following three kernel data structures.

(1) a B+ tree, for storing corresponding relations between Keys and address codes;

(2) an address translating table, for storing corresponding relations between the address codes and IP addresses, and between the address codes and port numbers; and (3) a MiniTable server monitoring table, for storing loading conditions of the MiniTable server corresponding to each address code.

When the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number.

If the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to a corresponding MiniTable server.

If the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

Figure 3:
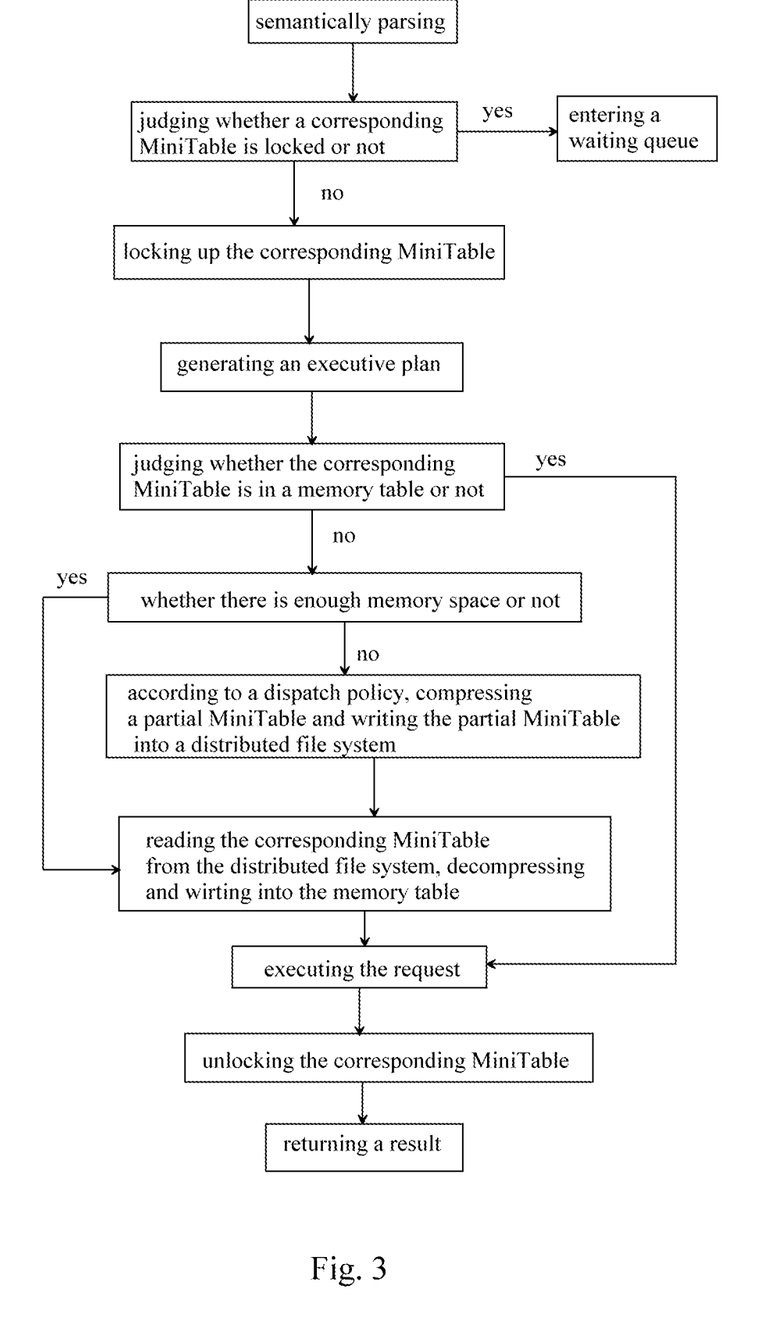
FIG. 3 is a flow chart of a MiniTable server according to the preferred embodiment of the present invention.

FIG. 3 shows subsequent executions of the MiniTable server.

Each MiniTable server has two kernel data structures of:

(1) a memory table, for storing a partial MiniTables according to a cache policy; and (2) a MiniTable lock, for recording locked MiniTables.

When the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan. Thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

The present invention obtains a capability of horizontal scaling via removing dependency among data sets, and a capability of agile development via supporting an analogous SQL grammar by saving dependency among data within the data sets.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A data storage and query method which supports an agile development and horizontal scaling, comprising steps of:

transforming data into a 2-tupel (Key, MiniTable), and identifying any MiniTable with a unique Key, wherein, the MiniTable comprises a plurality of data columns; a structure of each data column is limited via a pre-defined mode; and the data columns are sorted according to a primary key defined by the mode;

wherein the pre-defined mode is a Key-MiniTable mode having three basic primitives and three physical entities, wherein the three physical entities comprise:

a client for initiating a request to a Key server with the three basic primitives and receiving a result of the request;

the Key server for receiving the request initiated by the client, searching an IP address and a port number of each MiniTable server where each MiniTable corresponding to the Key is located, and accordingly transferring the request to the corresponding MiniTable server; and the MiniTable servers for receiving the request transferred by the Key server, parsing analogous SQL statements of the request, forming an execution plan, reading and writing the data in a distributed storage system, completing the request and returning a result of the request to the client.

2. The data storage and query method, as recited in claim 1, wherein the Key-MiniTable mode has the three basic primitives of:
  (1) Boolean Create (Key, column name 1: data type, column name 2: data type, ..., column name n: data type, PRIMARY KEY: column name), comprising creating a MiniTable identified as a Key and defining a mode of the MiniTable; if succeed, returning True; if fail, returning False;
  (2) Boolean Delete (Key), comprising deleting the MiniTable corresponding to the Key; if succeed, returning True; if fail or no corresponding Key, returning False; and
  (3) String Query (Key, analogous SQL statement), comprising executing the analogous SQL statement within the MiniTable corresponding to the Key and returning a return value of the analogous SQL statement which is one parameter of the Query primitive, wherein the analogous SQL statement comprises ten reserved words which are Select, Where, Insert, Update, Delete, Order By, Limit, Distinct, And and Or, and six connectives which are =, >, >=, <=, < and <>; grammars and semantics of the reserved words and the connectives are defined identically to a standard SQL.

3. The data storage and query method, as recited in claim 1, wherein each MiniTable has a limited size which is usually no larger than 64M, for being wholly placed into a data block of a Hadoop distributed file system; any two disparate MiniTables are forbidden to inter-table operations of a relational database which comprise join, so as to eliminate a necessity of jointly locking the several tables; the Key is not only the identifier of the MiniTable, but also an identification of a storage position in the distributed file system of the MiniTable.

4. The data storage and query method, as recited in claim 2, wherein each MiniTable has a limited size which is usually no larger than 64M, for being wholly placed into a data block of a Hadoop distributed file system; any two disparate MiniTables are forbidden to inter-table operations of a relational database which comprise join, so as to eliminate a necessity of jointly locking the several tables; the Key is not only the identifier of the MiniTable, but also an identification of a storage position in the distributed file system of the MiniTable.

5. The data storage and query method, as recited in claim 1, wherein the MiniTable records the data in a log format; adding, deleting and revising the data are all written into logs at ends of files; when a size of the MiniTable files gets close to a maximum capacity of a data block, an operation of merging logs is executed to create a new log file; the Key server and each MiniTable server write an operation into the system log file before executing the operation and write a return value thereof into the system log file when the operation is finished or fails.

6. The data storage and query method, as recited in claim 2, wherein the MiniTable records the data in a log format; adding, deleting and revising the data are all written into logs at ends of files; when a size of the MiniTable files gets close to a maximum capacity of a data block, an operation of merging logs is executed to create a new log file; the Key server and each MiniTable server write an operation into the system log file before executing the operation and write a return value thereof into the system log file when the operation is finished or fails.

7. The data storage and query method, as recited in claim 3, wherein the MiniTable records the data in a log format; adding, deleting and revising the data are all written into logs at ends of files; when a size of the MiniTable files gets close to a maximum capacity of a data block, an operation of merging logs is executed to create a new log file; the Key server and each MiniTable server write an operation into the system log file before executing the operation and write a return value thereof into the system log file when the operation is finished or fails.

8. The data storage and query method, as recited in claim 4, wherein the MiniTable records the data in a log format; adding, deleting and revising the data are all written into logs at ends of files; when a size of the MiniTable files gets close to a maximum capacity of a data block, an operation of merging logs is executed to create a new log file; the Key server and each MiniTable server write an operation into the system log file before executing the operation and write a return value thereof into the system log file when the operation is finished or fails.

9. The data storage and query method, as recited in claim 1, wherein the Key server has three kernel data structures of:
  (1) a B+ tree, for storing corresponding relations between the Keys and address codes;
  (2) an address translating table, for storing corresponding relations between the address codes and IP addresses, and between the address codes and the port numbers; and
  (3) a MiniTable server monitoring table, for storing for storing loading conditions of the MiniTable servers corresponding to each address code; wherein
  when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;
  if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;
  if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

10. The data storage and query method, as recited in claim 2, wherein the Key server has three kernel data structures of:
(1) a B+ tree, for storing corresponding relations between the Keys and address codes;
(2) an address translating table, for storing corresponding relations between the address codes and IP addresses, and between the address codes and the port numbers; and
(3) a MiniTable server monitoring table, for storing for storing loading conditions of the MiniTable servers corresponding to each address code; wherein
when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;
if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;
if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

11. The data storage and query method, as recited in claim 3, wherein the Key server has three kernel data structures of:
(1) a B+ tree, for storing corresponding relations between the Keys and address codes;
(2) an address translating table, for storing corresponding relations between the address codes and IP addresses, and between the address codes and the port numbers; and
(3) a MiniTable server monitoring table, for storing for storing loading conditions of the MiniTable servers corresponding to each address code; wherein
when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;
if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;
if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

12. The data storage and query method, as recited in claim 4, wherein the Key server has three kernel data structures of:
(1) a B+ tree, for storing corresponding relations between the Keys and address codes;
(2) an address translating table, for storing corresponding relations between the address codes and IP addresses, and between the address codes and the port numbers; and
(3) a MiniTable server monitoring table, for storing for storing loading conditions of the MiniTable servers corresponding to each address code; wherein
when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;
if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;

if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

13. The data storage and query method, as recited in claim 5, wherein the Key server has three kernel data structures of:

(1) a B+ tree, for storing corresponding relations between the Keys and address codes;

(2) an address translating table, for storing corresponding relations between the address codes and IP addresses, and between the address codes and the port numbers; and (3) a MiniTable server monitoring table, for storing for storing loading conditions of the MiniTable servers corresponding to each address code; wherein when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;

if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;

if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

14. The data storage and query method, as recited in claim 8, wherein the Key server has three kernel data structures of:

(1) a B+ tree, for storing corresponding relations between the Keys and address codes;

(2) an address translating table, for storing corresponding relations between the address codes and IP addresses, and between the address codes and the port numbers; and (3) a MiniTable server monitoring table, for storing for storing loading conditions of the MiniTable servers corresponding to each address code; wherein when the Key server receives a primitive request, the Key server checks whether the primitive request is a valid Query primitive; if yes, the Key server queries an address code corresponding to a Key in the B+ tree; if no existing Key, the Key server returns information of no existing Key; if the Key exists, the Key server queries an IP address and a port number corresponding to the address code in the address translating table; if no existing IP address and no existing port number, the Key server returns to error; if the IP address and the port number exist, the Key server transfers the request to the MiniTable server corresponding to the IP address and the port number;

if the request is not a valid Query primitive, the Key server checks whether the request is a valid Create primitive; if yes, the Key server queries whether a designated Key exists in the B+ tree; if the designated Key exists, the Key server returns information that the designated Key has existed; if no existing designated Key, the Key server allocates an address code according to a dispatch algorithm and the MiniTable server monitoring table, updates the MiniTable server monitoring table, queries an IP address and a port number corresponding to the address code and transfers the request to the corresponding MiniTable server;

if the request is not a valid Create primitive, the Key server checks whether the request is a valid Delete primitive; if yes, the Key server queries whether a designated Key exists in the B+ tree; If no existing designated Key, the Key server returns information of no existing designated Key; if the designated Key exists, the Key server queries an IP address and a port number corresponding to an address code in the address translating table, deletes the corresponding Key in the B+ tree, updates the MiniTable server monitoring table, queries the IP address and the port number and transfers the request to the corresponding MiniTable server.

15. The data storage and query method, as recited in claim 1, wherein each MiniTable server has two kernel data structures of:

(1) a memory table, for storing a partial MiniTable in memory according to a cache policy; and (2) a MiniTable lock, for recording locked MiniTable;

wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

16. The data storage and query method, as recited in claim 2, wherein each MiniTable server has two kernel data structures of:
   (1) a memory table, for storing a partial MiniTable in memory according to a cache policy; and
   (2) a MiniTable lock, for recording locked MiniTable;
   wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

17. The data storage and query method, as recited in claim 4, wherein each MiniTable server has two kernel data structures of:
   (1) a memory table, for storing a partial MiniTable in memory according to a cache policy; and
   (2) a MiniTable lock, for recording locked MiniTable;
   wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

18. The data storage and query method, as recited in claim 8, wherein each MiniTable server has two kernel data structures of:
   (1) a memory table, for storing a partial MiniTable in memory according to a cache policy; and
   (2) a MiniTable lock, for recording locked MiniTable;
   wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

19. The data storage and query method, as recited in claim 13, wherein each MiniTable server has two kernel data structures of:
   (1) a memory table, for storing a partial MiniTable in memory according to a cache policy; and
   (2) a MiniTable lock, for recording locked MiniTable;
   wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

20. The data storage and query method, as recited in claim 14, wherein each MiniTable server has two kernel data structures of:
   (1) a memory table, for storing a partial MiniTable in memory according to a cache policy; and
   (2) a MiniTable lock, for recording locked MiniTable;

wherein when the MiniTable server receives the request transferred by the Key server, the MiniTable server semantically parses the request and judges whether the MiniTable which requests an operation is locked or not; if yes, the MiniTable server adds the request into a waiting queue; if no, the MiniTable server locks up the MiniTable and generates an executive plan; thereafter, the MiniTable server judges whether the MiniTable is located in the memory table; if yes, the MiniTable server directly executes the request; if no, the MiniTable server further judges whether there is enough memory space or not; if no, the MiniTable server writes a partial MiniTable into a distributed file system according to the dispatch policy, comprising comparing a memory version of the MiniTable with a file version of the MiniTable and then only writing updated parts in in a log compressed format; after obtaining enough memory space, the MiniTable server reads the MiniTable file from the distributed file system and decompresses; the MiniTable server transforms the log files of the MiniTable into a format of data and stores the log files in the format of data into the memory table; then the MiniTable server executes the request, unlocks the MiniTable and returns a result.

* * * * *